United States Patent
Chen

(10) Patent No.: US 12,430,033 B2
(45) Date of Patent: Sep. 30, 2025

(54) NAND FLASH MEMORY CONTROLLER CAPABLE OF ADJUSTING ITS PROCESSING POWER ACCORDING TO ITS SPEED

(71) Applicant: REALTEK SEMICONDUCTOR CORPORATION, Hsinchu (TW)

(72) Inventor: Yen-Chung Chen, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 158 days.

(21) Appl. No.: 18/111,911

(22) Filed: Feb. 21, 2023

(65) Prior Publication Data

US 2023/0384938 A1    Nov. 30, 2023

(30) Foreign Application Priority Data

May 25, 2022   (TW) .................................. 111119551

(51) Int. Cl.
   *G06F 3/06*   (2006.01)
(52) U.S. Cl.
   CPC .......... *G06F 3/0613* (2013.01); *G06F 3/0625* (2013.01); *G06F 3/0634* (2013.01); *G06F 3/0679* (2013.01)
(58) Field of Classification Search
   CPC .... G06F 3/0613; G06F 3/0625; G06F 3/0634; G06F 3/0679; G06F 3/0659
   See application file for complete search history.

(56) References Cited

U.S. PATENT DOCUMENTS

| | | | | |
|---|---|---|---|---|
| 8,751,728 | B1* | 6/2014 | Syu ....................... | G06F 3/0679 |
| | | | | 711/171 |
| 8,981,751 | B1* | 3/2015 | Young ................... | H02M 3/157 |
| | | | | 323/283 |
| 2015/0355861 | A1* | 12/2015 | Jayaraman ............ | G06F 3/0632 |
| | | | | 711/103 |
| 2016/0210060 | A1* | 7/2016 | Dreyer .................. | G06F 3/0659 |
| 2016/0216899 | A1* | 7/2016 | Park ...................... | G06F 3/0655 |
| 2020/0042443 | A1* | 2/2020 | Keung .................. | G06F 3/0659 |
| 2020/0233606 | A1* | 7/2020 | Duan ........................ | G06F 1/10 |
| 2020/0356279 | A1* | 11/2020 | Chen ..................... | G06F 3/0611 |
| 2023/0040336 | A1* | 2/2023 | Basu ..................... | G06F 3/0613 |

* cited by examiner

*Primary Examiner* — Michael Krofcheck
(74) *Attorney, Agent, or Firm* — WPAT, PC

(57) ABSTRACT

A NAND flash memory controller can adjust its processing power according to a host speed and thereby save energy. The controller includes: a host speed estimation module estimating the host speed according to a first total data amount of the host's M first I/O command(s) received by the controller within a first period of time, the host speed correlating with the host's demand for access; a controller speed estimation module estimating a controller speed according to a second total data amount of the host's N second I/O command(s) completed by the controller within a second period of time, the controller speed correlating with the processing power of the controller; a speed decision module generating a decision result according to the relation between the host speed and the controller speed; and a speed adjustment module adjusting or maintaining the processing power of the controller according to the decision result.

10 Claims, 2 Drawing Sheets

NAND FLASH MEMORY CONTROLLER CAPABLE OF ADJUSTING ITS PROCESSING POWER ACCORDING TO ITS SPEED

BACKGROUND OF THE INVENTION

1. Field of the Invention

The present disclosure relates to a memory controller, especially to a NAND flash memory controller.

2. Description of Related Art

A general solid-state drive (SSD) controller is usually designed to fulfill the maximum operating speed of an SSD. Normally, when all internal clocks of the SSD controller are set for their respective highest frequencies and all internal resources (e.g., all parts of a cache memory) of the SSD controller are set accessible, the SSD controller can fulfill the maximum operation speed of the SSD. However, in the above-mentioned circumstance the SSD controller consumes a lot of energy and generates a lot of heat.

In order to save energy, when an SSD controller does not receive any input/output (I/O) command from a host within a period of time, a current art allows the SSD controller to enter a low power state and thereby turn off or turn down some internal clock(s) of the SSD controller. However, if the above-mentioned period of time is long, the SSD controller usually has no chance to enter the low power state and thereby cannot achieve the effects of energy saving; and if the period of time is short, the SSD controller is likely to changes the frequency of the internal clock frequently, and this affects the performance of the SSD controller.

SUMMARY OF THE INVENTION

An object of the present disclosure is to provide a NAND flash memory controller capable of adequately adjusting processing power of the NAND flash memory controller according to a host's demand for access.

An embodiment of the NAND flash memory controller of the present disclosure includes a host speed estimation module, a controller speed estimation module, a speed decision module, and a speed adjustment module. The host speed estimation module is configured to estimate a host speed according to a first total data amount of M first input/output (I/O) command(s) received by the NAND flash memory controller within a first period of time, wherein the host speed correlates with a host's demand for access, the M first I/O command(s) come(s) from the host, and the M is a positive integer. The controller speed estimation module is configured to estimate a controller speed according to a second total data amount of N second I/O command(s) completed by the NAND flash memory controller within a second period of time, wherein the controller speed correlates with current setting of the processing power of the NAND flash memory controller, the N second I/O command(s) come(s) from the host, and the N is a positive integer. The speed decision module is configured to generate a decision result according to a relation between the host speed and the controller speed. The speed adjustment module configured to adjust or maintain the processing power according to the decision result. To sum up, this embodiment adjusts or maintains the processing power of the NAND flash memory controller according to the relation between the host speed and the controller speed.

Another embodiment of the NAND flash memory controller of the present disclosure includes a controller speed estimation module, a speed decision module, and a speed adjustment module. The controller speed estimation module is configured to estimate a controller speed according to a total data amount of N input/output (I/O) command(s) completed by the NAND flash memory controller within a period of time, wherein the controller speed correlates with current setting of the processing power of the NAND flash memory controller, the N I/O command(s) come(s) from a host, and the N is a positive integer. The speed decision module is configured to generate a decision result according to a variation in the controller speed. The speed adjustment module is configured to adjust or maintain the processing power according to the decision result. To sum up, this embodiment adjusts or maintains the processing power of the NAND flash memory controller according to the variation in the controller speed.

A further embodiment of the NAND flash memory controller of the present disclosure is configured to adjust or maintain processing power of the NAND flash memory controller according to a relation between a host speed and a controller speed or according to a variation in the controller speed, wherein the host speed correlates with a host's demand for access and the controller speed correlates with current setting of the processing power of the NAND flash memory controller.

These and other objectives of the present invention will no doubt become obvious to those of ordinary skill in the art after reading the following detailed description of the preferred embodiments that are illustrated in the various figures and drawings.

DETAILED DESCRIPTION OF THE PREFERRED EMBODIMENTS

The present specification discloses a NAND flash memory controller (e.g., a solid-state drive (SSD) controller; an Embedded Multimedia Card (eMMC) controller; a Universal Flash Storage (UFS) controller; or a Secure Digital (SD) memory card controller) capable of adequately adjusting the processing power of the NAND flash memory controller according to a host's demand for access to save energy.

Figure 1:
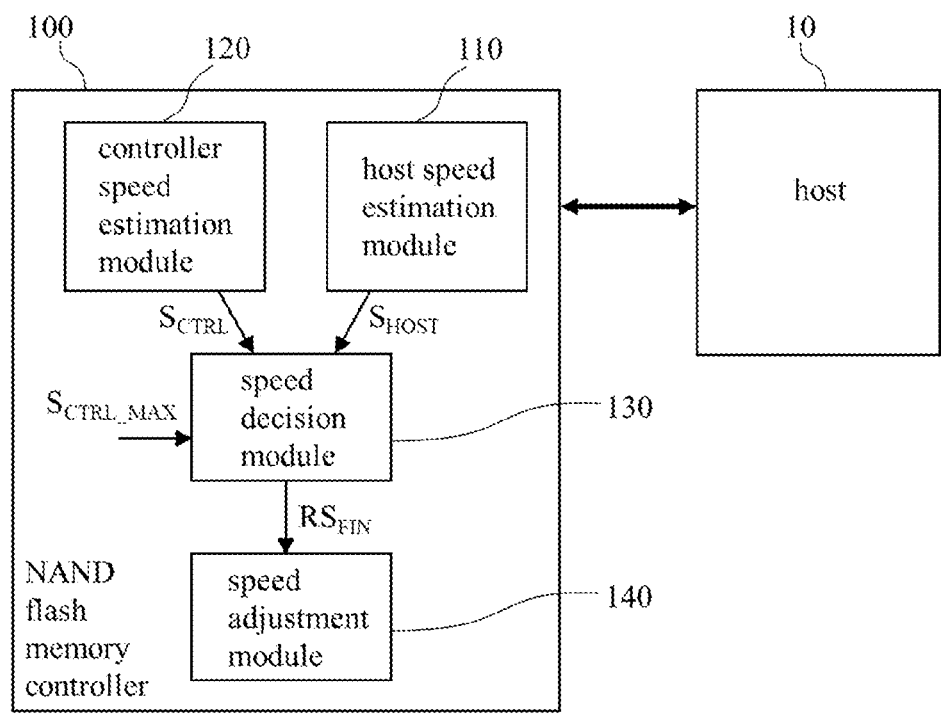
FIG. 1 shows an embodiment of the NAND flash memory controller of the present disclosure.

FIG. 1 shows an embodiment of the NAND flash memory controller of the present disclosure. The NAND flash memory controller 100 (hereinafter referred to as "the controller 100") of FIG. 1 includes a host speed estimation module 110, a controller speed estimation module 120, a speed decision module 130, and a speed adjustment module 140. These modules are described in the following paragraphs, respectively.

Regarding the embodiment of FIG. 1, the host speed estimation module 110 is configured to estimate a host speed $S_{HOST}$ according to a first total data amount of M first input/output (I/O) command(s) received by the controller 100 within a first period of time, wherein the host speed $S_{HOST}$ correlates with the processing power of a host 10, the M first I/O command(s) come(s) from the host 10, and the M is a positive integer. For example, providing the first period of time is 10 milliseconds (10 ms), the M first I/O commands are 250 I/O commands, and the data amount of each I/O command is 128 Kbyte, that is to say that the length of each I/O command is 128 Kbyte, the first total data amount will be 250×128 Kbyte and the host speed $S_{HOST}$ will be $$\frac{250 \times 128 \text{ Kbyte}}{10 \text{ ms}} = 3200 \text{ Mbyte/s}.$$

For example, providing the first period of time is 5 ms, the M first I/O commands are 50 I/O commands composed of 30 first-length I/O commands and 20 second-length I/O commands, and the data amount of each of the 30 first-length I/O commands is 128 Kbyte and the data amount of each of the 20 second-length I/O commands is 256 Kbyte, the first total data amount will be 30×128 Kbyte+20×256 Kbyte and the host speed $S_{HOST}$ will be $$\frac{30 \times 128 \text{ Kbyte} + 20 \times 256 \text{ Kbyte}}{5 \text{ ms}} = 1792 \text{ Mbyte/s}.$$

More examples can be derived from the above descriptions. It is noted that the controller 100 receives I/O command(s) from the host 10 in a conventional/self-developed manner, but this falls beyond the scope of the present disclosure. In addition, the calculation of the first total data amount can be performed by the host speed estimation module 110 or some conventional/self-developed computing circuit (not shown in the figures). Furthermore, the host speed estimation module 110 can be realized with hardware circuits or realized with a processor (not shown in the figures) of the controller 100 performing firmware, wherein the content of the firmware can be derived from the descriptions of the calculation of the host speed $S_{HOST}$ and realized with known programming languages.

Regarding the embodiment of FIG. 1, the controller speed estimation module 120 is configured to estimate a controller speed $S_{CTRL}$ according to a second total data amount of N second I/O command(s) completed by the controller 100 within a second period of time, wherein the controller speed $S_{CTRL}$ correlates with the current setting of the processing power of the controller 100, the N second I/O command(s) come(s) from the host 10, and the N is a positive integer. For example, providing the second period of time is 10 ms, the N second I/O commands are 200 I/O commands, and the data amount of each I/O command is 128 Kbyte, that is to say that the length of each I/O command is 128 Kbyte, the second total data amount will be 200×128 Kbyte and the controller speed $S_{CTRL}$ will be $$\frac{200 \times 128 \text{ Kbyte}}{10 \text{ ms}} = 2560 \text{ Mbyte/s}.$$

For example, providing the second period of time is 20 ms, the N second I/O commands are 300 I/O commands composed of 200 first-length I/O commands and 100 second-length I/O commands, and the data amount of each of the 200 first-length I/O commands is 128 Kbyte and the data amount of each of the 100 second-length I/O commands is 256 Kbyte, the second total data amount will be 200×12 8 Kbyte+100×256 Kbyte and the controller speed $S_{CTRL}$ will be $$\frac{200 \times 128 \text{ Kbyte} + 100 \times 256 \text{ Kbyte}}{10 \text{ ms}} = 5120 \text{ Mbyte/s}.$$

More examples can be derived from the above descriptions. It is noted that the calculation of the second total data amount can be performed by the controller speed estimation module 120 or some conventional/self-developed computing circuit (not shown in the figures). In addition, the controller speed estimation module 120 can be realized with hardware circuits or realized with a processor (not shown in the figures) of the controller 100 performing firmware, wherein the content of the firmware can be derived from the descriptions of the calculation of the controller speed $S_{CTRL}$ and realized with known programming languages.

Regarding the embodiment of FIG. 1, the speed decision module 130 is configured to generate a decision result $RS_{FIN}$ according to the relation between the host speed $S_{HOST}$ and the controller speed $S_{CTRL}$. For example, providing the top limit of the controller speed $S_{CTRL}$ is $S_{CTRL\_MAX}$, the speed decision module 130 compares the host speed $S_{HOST}$ with the controller speed $S_{CTRL}$ and compares the controller speed $S_{CTRL}$ with the top limit $S_{CTRL\_MAX}$ so as to generate the decision result $RS_{FIN}$, wherein the decision result $RS_{FIN}$ indicates one of the following relations: (1) $S_{CTRL} < S_{HOST}$ and $S_{CTRL} < S_{CTRL\_MAX}$; (2) $S_{CTRL} < S_{HOST}$ and $S_{CTRL} = S_{CTRL\_MAX}$; (3) $S_{CTRL} = S_{HOST}$; and (4) $S_{CTRL} > S_{HOST}$. When the decision results $RS_{FIN}$ indicates the relation (1), it means that the controller speed $S_{CTRL}$ does not catch up with the host speed $S_{HOST}$ and the controller speed $S_{CTRL}$ does not reach the top limit and can be increased to improve efficiency. When the decision results $RS_{FIN}$ indicates the relation (2), it means that the controller speed $S_{CTRL}$ does not catch up with the host speed $S_{HOST}$ and the controller speed $S_{CTRL}$ has reached the top limit and cannot be increased. When the decision results $RS_{FIN}$ indicates the relation (3), it means that the controller speed $S_{CTRL}$ is equal to the host speed $S_{HOST}$, which is energy efficient. When the decision results $RS_{FIN}$ indicates the relation (4), it means that the controller speed $S_{CTRL}$ is higher than the host speed $S_{HOST}$ and the controller speed $S_{CTRL}$ can be decreased to save energy. It is noted that the speed decision module 130 can further determine whether the controller speed $S_{CTRL}$ reaches a bottom limit $S_{CTRL\_MIN}$ of the controller speed $S_{CTRL}$ and thereby generate the decision result $RS_{FIN}$. In addition, the speed decision module 130 can be realized with hardware circuits or realized with a processor (not shown in the figures) of the controller 100 performing firmware, wherein the content of the firmware can be derived from the above descriptions and realized with known programming languages.

Regarding the embodiment of FIG. 1, the speed adjustment module 140 is configured to periodically/non-periodically adjust or maintain the processing power of the controller 100 according to the decision result $RS_{FIN}$. For example, when the decision result $RS_{FIN}$ indicates the aforementioned relation (1), the speed adjustment module 140 increases the processing power to make the controller speed $S_{CTRL}$ catch up with the host speed $S_{HOST}$; when the decision result $RS_{FIN}$ indicates the aforementioned relation (2), the speed adjustment module 140 maintains the processing power to make the controller 100 operate at its maximum speed; when the decision result $RS_{FIN}$ indicates the aforementioned relation (3), the speed adjustment module 140 maintains the processing power to maintain the equilibrium of the controller speed $S_{CTRL}$ and the host speed $S_{HOST}$; and when the decision result $RS_{FIN}$ indicates the aforementioned relation (4), the speed adjustment module 140 decreases the processing power to save energy. It is noted that when the decision result $RS_{FIN}$ indicates the aforementioned relation (4), if the decision result $RS_{FIN}$ also indicates that the controller speed $S_{CTRL}$ is not higher than the bottom limit $S_{CTRL\_MIN}$ of the controller speed $S_{CTRL}$, the speed adjustment module 140 can maintain the processing power to ensure the basic efficiency of the controller 100. In addition, the speed adjustment module 140 can be realized with hardware circuits or realized with a processor (not shown in the figures) of the controller 100 performing firmware, wherein the content of the firmware can be derived from the above descriptions and realized with known programming languages.

Regarding the embodiment of FIG. 1, the speed adjustment module 140 can adjust the processing power of the controller 100 in at least one of the following manners: adjusting the frequency/frequencies of at least one clock (e.g., the clock for a processor of the controller 100 and/or the clock for a bus of the controller 100) of the controller 100; and turning off at least one circuit of the controller 100 (e.g., a part of a static random access memory (SRAM) of the controller 100) or reducing the consumption of power of the at least one circuit. Other known/self-developed manners for adjusting the processing power can be applied to the speed adjustment module 140.

Figure 2:
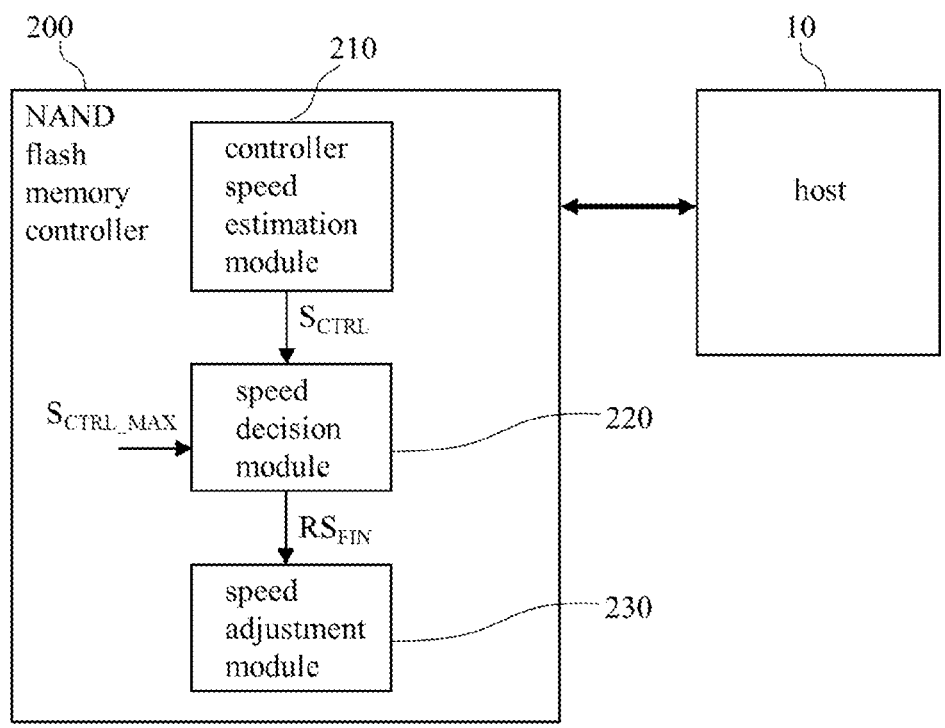
FIG. 2 shows another embodiment of the NAND flash memory controller of the present disclosure.

FIG. 2 shows another embodiment of the NAND flash memory controller of the present disclosure. The NAND flash memory controller 200 (hereinafter referred to as "the controller 200") of FIG. 2 includes a controller speed estimation module 210, a speed decision module 220, and a speed adjustment module 230. These modules are described in the following paragraphs, respectively.

Regarding the embodiment of FIG. 2, the controller speed estimation module 210 is configured to estimate a controller speed $S_{CTRL}$ according to a total data amount of N input/output (I/O) command(s) completed by the controller 200 within a period of time, wherein the controller speed $S_{CTRL}$ correlates with the current setting of the processing power of the controller 200, the N I/O command(s) come(s) from a host 10, and the N is a positive integer. The controller speed estimation module 210 is identical/similar to the aforementioned controller speed estimation module 120 of FIG. 1, and repeated and redundant description is omitted here.

Regarding the embodiment of FIG. 2, the speed decision module 220 is configured to generate a decision result $RS_{FIN}$ according to a variation $VAR_{SCTRL}$ in the controller speed $S_{CTRL}$. For example, the speed decision module 220 compares a current controller speed $S_{CTRL\_CURR}$ (i.e., the controller speed $S_{CTRL}$ at a current time point) with a previous controller speed $S_{CTRL\_PRE}$ (i.e., the controller speed $S_{CTRL}$ at a previous time point) to obtain the variation $VAR_{SCTRL}$ (e.g., $VAR_{SCTRL}=S_{CTRL\_CURR}-S_{CTRL\_PRE}$), and then the speed decision module 220 generates the decision result $RS_{FIN}$ according to the variation $VAR_{SCTRL}$. Providing the top limit of the controller speed $S_{CTRL}$ is $S_{CTRL\_MAX}$, the decision result $RS_{FIN}$ indicates one of the following relations: (a) $VAR_{SCTRL}>0$ and $S_{CTRL\_CURR}<S_{CTRL\_MAX}$; (b) $VAR_{SCTRL}>0$ and $S_{CTRL\_CURR}=S_{CTRL\_MAX}$; (c) $VAR_{SCTRL}=0$; and (d) $VAR_{SCTRL}<0$. It is noted that the speed decision module 220 may further determine whether the controller speed $S_{CTRL}$ reaches the bottom limit $S_{CTRL\_MIN}$ of the controller speed $S_{CTRL}$ and thereby generate the decision result $RS_{FIN}$. In addition, the speed decision module 220 can be realized with hardware circuits or realized with a processor (not shown in the figures) of the controller 200 performing firmware, wherein the content of the firmware can be derived from the above descriptions and realized with known programming languages.

Regarding the embodiment of FIG. 2, the speed adjustment module 230 is configured to periodically/non-periodically adjust or maintain the processing power of the controller 200 according to the decision result $RS_{FIN}$. For example, providing the speed adjustment module 230 increased the processing power of the controller 200 last time:

(i) when the decision result $RS_{FIN}$ indicates the aforementioned relation (a), it means that the adjustment in the processing power is effective the controller speed $S_{CTRL}$ has not reached its limit $S_{CTRL\_MAX}$, and thus the speed adjustment module 230 continues to increase the processing power this time;

(ii) when the decision result $RS_{FIN}$ indicates the aforementioned relation (b), it means that the adjustment in the processing power is effective and the controller speed $S_{CTRL}$ has reached its limit $S_{CTRL\_MAX}$, and thus the speed adjustment module 230 maintains the processing power this time;

(iii) when the decision result $RS_{FIN}$ indicates the aforementioned relation (c), it means that the adjustment in the processing power is ineffective, and thus the speed adjustment module 230 maintains or decreases the processing power this time (e.g., decreasing the processing power to offset the latest increase in the processing power); and (iv) when the decision result $RS_{FIN}$ indicates the aforementioned relation (d), it implies that the adjustment in the processing power is contrary to the variation in the host's demand for access, and thus the speed adjustment module 230 decreases the processing power this time.

For example, providing the speed adjustment module 230 decreased the processing power of the controller 200 last time:

(i) when the decision result $RS_{FIN}$ indicates the aforementioned relation (a), it implies that the adjustment in the processing power is contrary to the variation in the host's demand for access, and thus the speed adjustment module 230 increases the processing power this time;

(ii) when the decision result $RS_{FIN}$ indicates the aforementioned relation (c), it means that the processing power is in excess of needs, and thus the speed adjustment module 230 continues to decrease the processing power this time; and (iii) when the decision result $RS_{FIN}$ indicates the aforementioned relation (d), it means that the decrease in the processing power is overdone, and thus the speed adjustment module 230 maintains or increases the processing power this time (e.g., increasing the processing power to offset the latest decrease in the processing power).

The speed adjustment module 230 can be realized with hardware circuits or realized with a processor (not shown in the figures) of the controller 200 performing firmware, wherein the content of the firmware can be derived from the above descriptions and realized with known programming languages.

Regarding the embodiment of FIG. 2, the speed adjustment module 230 can adjust the processing power of the controller 200 in at least one of the following manners: adjusting the frequency/frequencies of at least one clock (e.g., the clock for a processor of the controller 200 and/or the clock for a bus of the controller 200) of the controller 200; and turning off at least one circuit of the controller 200 (e.g., a part of a static random access memory (SRAM) of the controller 200) or reducing the consumption of power of the at least one circuit. Other known/self-developed manners for adjusting the processing power can be applied to the speed adjustment module 230.

It is noted that people having ordinary skill in the art can selectively use some or all of the features of any embodiment in this specification or selectively use some or all of the features of multiple embodiments in this specification to implement the present invention as long as such implementation is practicable; in other words, the way to implement the present invention can be flexible based on the present disclosure.

To sum up, the NAND flash memory controller of the present disclosure can adequately adjust the processing power of the NAND flash memory controller according to a host's demand for access to save energy.

The aforementioned descriptions represent merely the preferred embodiments of the present invention, without any intention to limit the scope of the present invention thereto. Various equivalent changes, alterations, or modifications based on the claims of the present invention are all consequently viewed as being embraced by the scope of the present invention.

What is claimed is:

1. A NAND flash memory controller capable of adjusting processing power of the NAND flash memory controller, the NAND flash memory controller comprising:
    a controller speed estimation module configured to estimate a controller speed of the NAND flash memory controller according to a total data amount of N input/output (I/O) command(s) completed by the NAND flash memory controller within a period of time, wherein the controller speed correlates with current setting of the processing power, the N I/O command(s) come(s) from a host, and the N is a positive integer;
    a speed decision module configured to compare the controller speed estimated at a current time point with the controller speed estimated at a previous time point to generate a decision result indicating a variation in the controller speed; and
    a speed adjustment module configured to adjust or maintain the processing power according to the decision result.

2. The NAND flash memory controller of claim 1, wherein the controller speed estimation module adds up N data amount(s) of the N I/O command(s) to obtain the total data amount, and then divides the total data amount by the period of time to estimate the controller speed.

3. The NAND flash memory controller of claim 1, wherein a data amount of each of the N I/O command(s) is a fixed data amount; and the controller speed estimation module multiplies a total command number of the N I/O command(s) by the fixed data amount to obtain the total data amount, and then divides the total data amount by the period of time to estimate the controller speed.

4. The NAND flash memory controller of claim 1, wherein after the speed adjustment module increases the processing power, when the variation indicates that the controller speed at the current time point is higher than the controller speed at the previous time point and is not higher than a top limit of the controller speed, the speed decision module generates the decision result to request the speed adjustment module to increase the processing power again.

5. The NAND flash memory controller of claim 4, wherein after the speed adjustment module increases the processing power again, when the variation indicates that the controller speed remains unchanged, the speed decision module generates the decision result to request the speed adjustment module to maintain or decrease the processing power.

6. The NAND flash memory controller of claim 1, wherein after the speed adjustment module decreases the processing power, when the variation indicates that the controller speed remains unchanged, the speed decision module generates the decision result to request the speed adjustment module to decrease the processing power again.

7. The NAND flash memory controller of claim 6, wherein after the speed adjustment module decreases the processing power again, when the variation indicates that the controller speed at the current time point is lower than the controller speed at the previous time point, the speed decision module generates the decision result to request the speed adjustment module to maintain or increase the processing power.

8. The NAND flash memory controller of claim 1, wherein the speed adjustment module adjusts the processing power in at least one of the following manners: adjusting a frequency of at least one clock of the NAND flash memory controller; and turning off at least one circuit of the NAND flash memory controller or reducing consumption of power of the at least one circuit.

9. The NAND flash memory controller of claim 8, wherein the at least one clock includes a clock for a processor and/or a clock for a bus; and the at least one circuit includes a part of a static random access memory (SRAM).

10. A NAND flash memory controller configured to adjust or maintain processing power of the NAND flash memory controller according to a decision result indicating a variation in a controller speed of the NAND flash memory controller, wherein the decision result is generated by the NAND flash memory controller comparing the controller speed estimated at a current time point with the controller speed estimated at a previous time point.

* * * * *